(12) United States Patent
Cook et al.

(10) Patent No.: US 7,082,844 B1
(45) Date of Patent: Aug. 1, 2006

(54) STRAIN SENSOR HAVING IMPROVED ACCURACY

(75) Inventors: Kim D. Cook, Wakarusa, IN (US); Terry R. Bloom, Middlebury, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 11/058,480

(22) Filed: Feb. 16, 2005

(51) Int. Cl.
*G01D 7/00* (2006.01)

(52) U.S. Cl. .................................. 73/862.041
(58) Field of Classification Search ............... None
See application file for complete search history.

(56) References Cited

U.S. PATENT DOCUMENTS

| | | | | |
|---|---|---|---|---|
| 4,188,636 A | * | 2/1980 | Sato et al. | 257/737 |
| RE31,698 E | * | 10/1984 | Sansome et al. | 73/862.635 |
| 5,907,095 A | * | 5/1999 | Lin | 73/105 |
| 5,959,214 A | | 9/1999 | Vaidyanthan et al. | |
| 5,966,117 A | | 10/1999 | Seffernick et al. | |
| 6,056,888 A | * | 5/2000 | August | 216/16 |
| 6,161,891 A | | 12/2000 | Blakesley et al. | |
| 6,225,526 B1 | | 5/2001 | Flugge et al. | |
| 6,231,076 B1 | | 5/2001 | Blakesley et al. | |
| 6,244,116 B1 | | 6/2001 | Osmer et al. | |
| 6,407,347 B1 | | 6/2002 | Blakesley et al. | |
| 6,407,350 B1 | | 6/2002 | Blakesley et al. | |
| 6,803,658 B1 | * | 10/2004 | Suzuki | 257/737 |
| 2002/0166385 A1 | | 11/2002 | Bloom et al. | |
| 2003/0213623 A1 | | 11/2003 | Axakov et al. | |

* cited by examiner

*Primary Examiner*—Max Noori
*Assistant Examiner*—Octavia Davis
(74) *Attorney, Agent, or Firm*—Mark P. Bourgeois

(57) ABSTRACT

A strain sensor that is suited for use as an occupant weight sensor in a vehicle seat is disclosed. The strain sensor includes a substrate having a top surface and a bottom surface. Several bumps are located on the top surface. The bumps extend above the top surface. The bumps are arranged in a pattern. A dielectric material is located on the top surface. At least one strain sensitive resistor is located on the dielectric material. Several conductive traces are formed on the dielectric material and are electrically connected with the strain sensitive resistor.

14 Claims, 6 Drawing Sheets

STRAIN SENSOR HAVING IMPROVED ACCURACY

BACKGROUND

1. Field of the Invention

This invention relates to strain sensors. The invention relates more particularly to a strain sensor design that has increased accuracy and that has improved manufacturability.

2. Description of Related Art

The United States government has identified air bag inflation control as an important area for development. It has mandated that thirty-five percent of automobiles sold in the United States starting in model year 2004 incorporate a system capable of detecting the weight of the occupant and deploying the air bag with varying force depending on that weight.

One approach to measuring occupant weight relies on a load bearing member in the seat structure having a strain-dependent electric resistance or strain sensor. The change in electrical resistance of the load bearing member serves as an indication of occupant weight.

Strain-dependent resistance may be provided by thick film resistive systems in conjunction with strain sensitive paints. Such paints, sometimes also referred to as "inks" or "resistive inks", may be formulated so that dopants are present in boundaries where ruthenium crystals sinter during processing. At these points, as the overall structure is compressed, better contact is made between the crystals reducing the resistance of the material. Conversely, as the material is flexed, less contact is made and the resistance of the overall material is increased.

It is common in the art to attempt to maximize the amount of the strain sensitivity of the resistive ink materials. This is done to provide as high of a signal level as possible for the output from the device. Increased sensitivity is especially important for designs with ceramic substrates which are brittle and can be damaged with excessive bending. Thus, the amount of flexing or compression may be limited, resulting in a corresponding reduction in the output range available in the sensor Generally, the paint materials are applied on an electrically insulative substrate in order to be used. If the paint were applied to a conductive material, the substrate would effectively provide a short circuit across the resistive material, rendering the sensor useless. Ceramic substrates have been used effectively to provide stress measurement, for example in use as pointing devices for laptop computers as described in U.S. Pat. No. 5,966,117 or as shear beam load cells as described in U.S. Pat. No. 6,225,526. However, ceramic materials are not adequate in some applications such as seat weight sensors where excessive stress or bending can occur. In these situations the ceramic substrate will break and the output signal will no longer be representative of the strain being measured. Thus, it would be advantageous to utilize a stronger material such as stainless steel in a load-bearing strain sensor.

It is known to provide a layer of porcelain as an insulative layer for screened resistive materials on steel. The steel provides a much improved mechanical substrate for the resistive paint materials. For example, U.S. Pat. No. 5,959,214 teaches providing a coating layer over the dielectric material before adding the strain sensitive materials.

Other examples of strain sensors are shown in United States Patents and Patent Publication Nos. 6,407,350, 6,407,347, 6,244,116, 6,231,076, 6,161,891 and 2002/0166385.

One problem that is common to all types of substrate materials used in strain sensors is warping and lack of flatness. Since most substrates are pressed or stamped, imperfections in the substrate material or stamping die can introduce unwanted variations in the thickness and planarity of the substrate during manufacturing. Unfortunately, a substrate that has as little as 0.001 inch of warp across a 1-inch diameter substrate can cause a strain resistor to be inaccurate and have a non-linear output.

A possible solution to planarize the substrates is to machine the substrates after stamping. Unfortunately, machining each substrate is costly, time consuming and introduces excessive cycle time for a high volume manufacturing operation.

A current unmet need exists for a cost effective strain sensor that can provide a linear output while at the same time accommodating substrate warping.

SUMMARY

The present invention provides a strain sensor with increased accuracy and improved manufacturability.

The present invention further provides a strain sensor for use with a vehicle seat. The sensor senses the weight of the seat occupant.

Another feature of the present invention is to provide a strain sensor that includes a substrate having a top surface and a bottom surface. Several bumps are located on the top surface. The bumps extend above the top surface. The bumps are arranged in a pattern. A dielectric material is located on the top surface. At least one strain sensitive resistor is located on the dielectric material. Several conductive traces are formed on the dielectric material and are electrically connected with the strain sensitive resistor.

Figure 1:
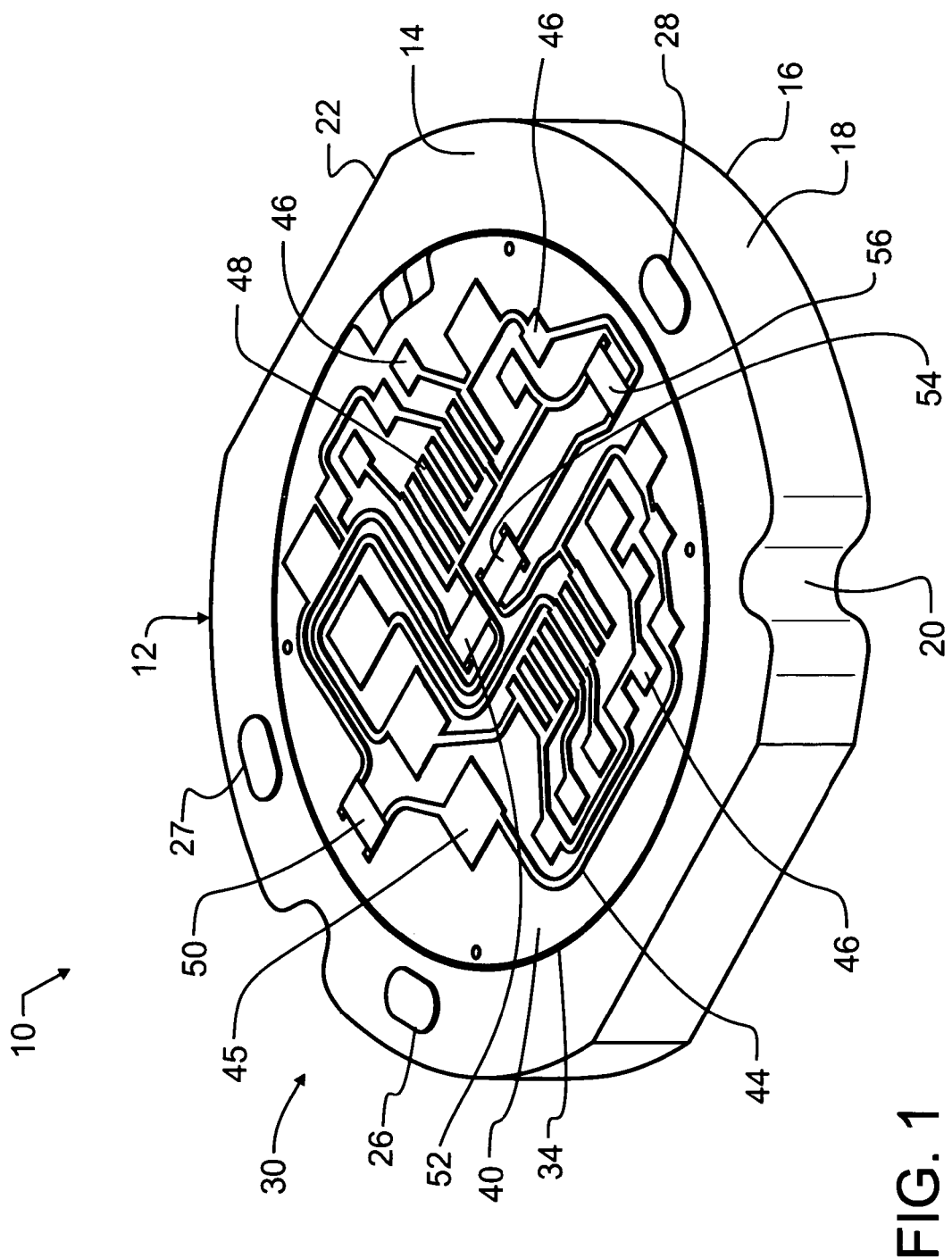
FIG. 1 is a perspective view of an embodiment of the invention showing a strain sensor.
Figure 2:
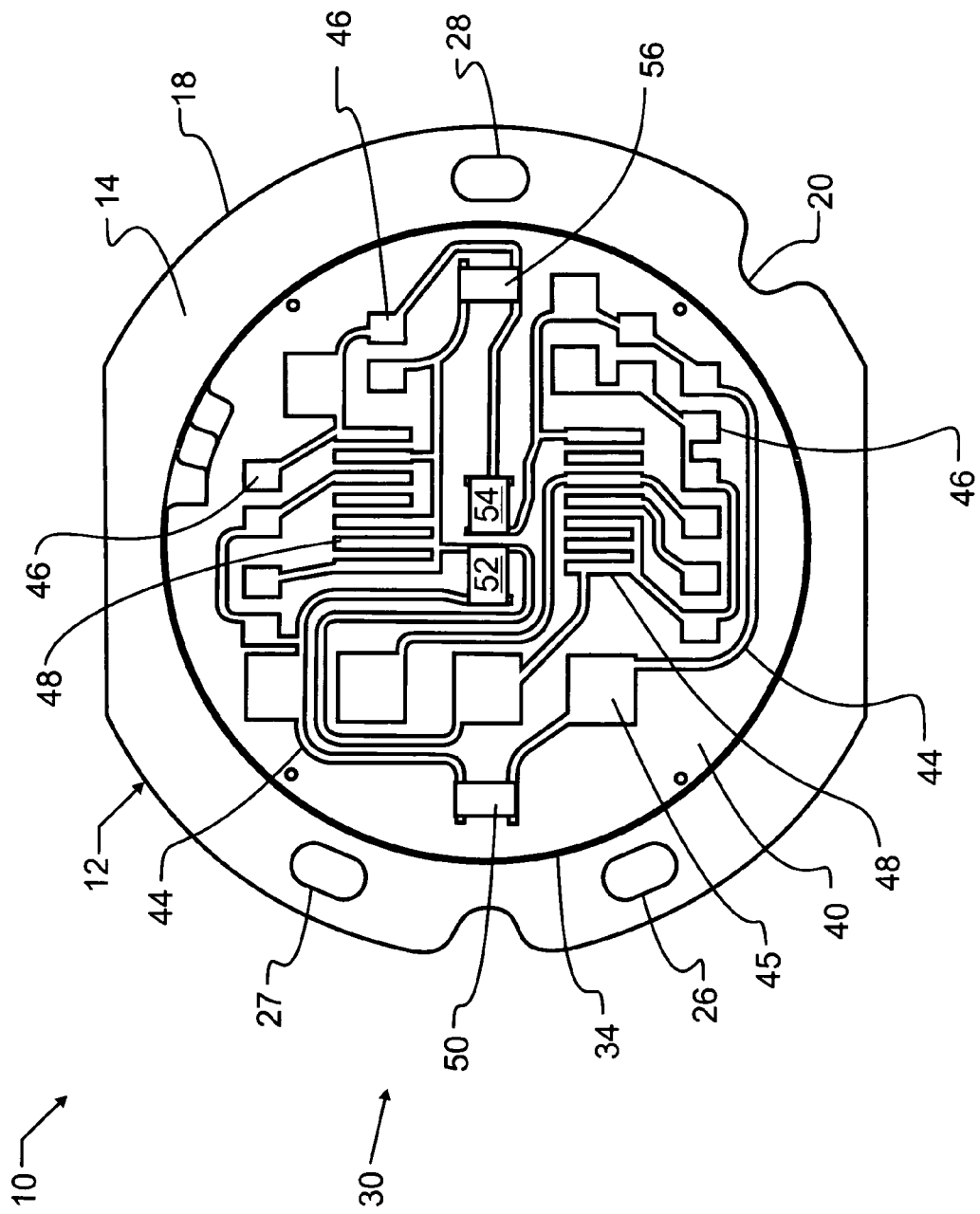
FIG. 2 is a top view of FIG. 1.
Figure 3:
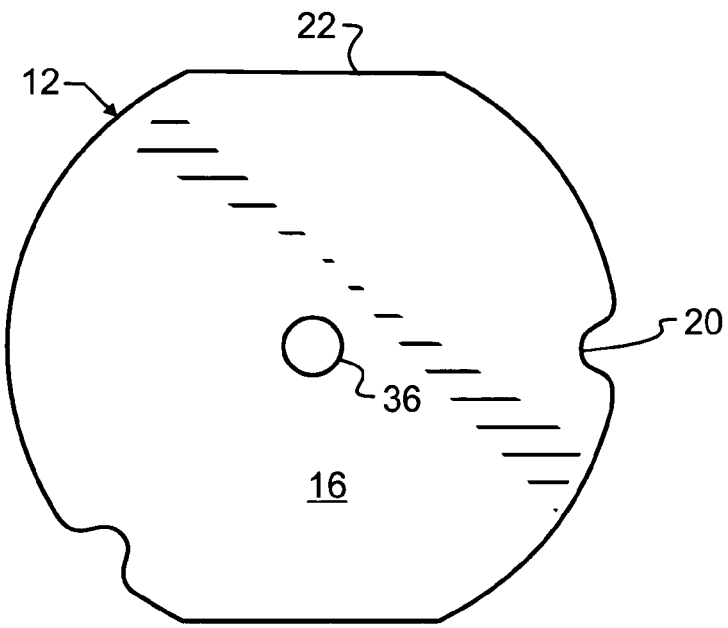
FIG. 3 is a bottom view of FIG. 1.
Figure 4:
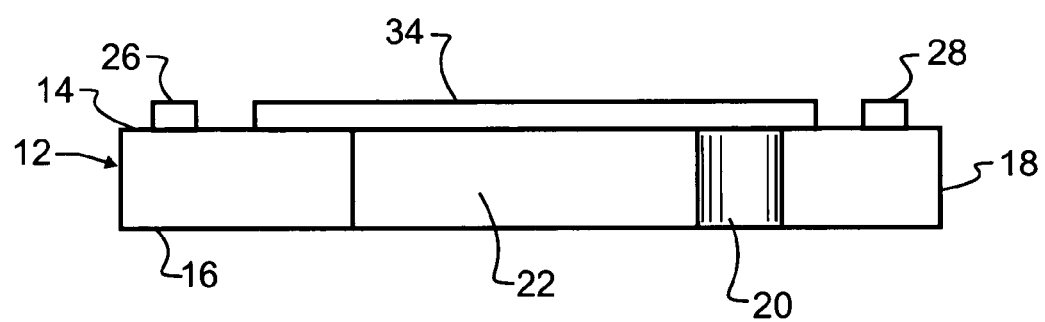
FIG. 4 is a side view of FIG. 1.

It is noted that the drawings of the invention are not to scale.

DETAILED DESCRIPTION

Strain Sensor

Referring to FIGS. 1–5, a strain sensor 10 is shown. Strain sensor 10 has a planar circular substrate 12. Substrate 12 has a top surface 14, a bottom surface 16 and an outer peripheral edge 18. Several notches 20 and flat sections 22 are located along the outer peripheral edge 18 for placement and alignment of sensor 10 during assembly.

Substrate 12 is preferably formed using fine blanking of 430 stainless steel. Other materials and other common methods of forming such as stamping and machining can also be used. Substrate 12 can have typical dimensions of 24.8 mm in diameter and 3.17 mm in thickness. Other substrate dimensions can be used. However, there are practical limits on the dimensions of substrate 12. For example, substrate thickness less than 2 mm can be too weak and subject to permanent deformation under load. Substrate thickness greater than 5 mm do not allow enough strain to be imparted to the sensor and leads to poor signal output. Substrate diameters greater than 40 mm are difficult to package in a vehicle seat. Substrate diameters less than 10 mm do not have enough space to package the necessary electronic components.

Three oval shaped raised portions or bumps 26, 27 and 28 are located on top surface 14. Bumps 26, 27 and 28 extend above top surface 14. Bumps 26, 27 and 28 are located close to outer peripheral edge 18. Bumps 26, 27 and 28 are arranged to form a pattern 30. Bumps 26, 27 and 28 form a tripod. Bumps 26, 27 and 28 have an angular relationship to each other. Bumps 26 and 27 are located approximately 50 degrees apart. Bumps 27 and 28 can be located approximately 155 degrees apart. Bumps 26 and 28 can be located approximately 155 degrees apart. Bumps 26, 27 and 28 can have typical dimensions of 2.28 in length, 1.3 mm in width and 0.17 mm in height.

Bumps 26, 27 and 28 can use other angular relationships to each other. However, it has been found experimentally that when 2 of the bumps are brought closer in line with the resistors 50–56, the output of the sensor is increased. The output of the sensor was greater when the angular separation between bumps 26 and 27 was decreased from 120 degrees to 50 degrees. This effect is believed to be due to the sensor acting more like a beam when bumps 26 and 27 are located closer to each other. The preferred angular separation range between bumps 26 and 27 is between 12 to 60 degrees.

A raised central portion 34 is located on top surface 14 and can have a height of 0.17 mm above top surface 14. It is noted that central raised portion 34 and bumps 26, 27 and 28 have the same height above top surface 14. In other words, central raised portion 34 and bumps 26, 27 and 28 are located in the same plane.

A recess 36 is located on bottom surface 16. Bumps 26, 27 and 28, raised central portion 34 and recess 36 are formed during the fine blanking of substrate 12. Bumps 26, 27 and 28, raised central portion 34 and recess 36 can also be formed by stamping or machining.

Central portion 34 is covered with several layers of dielectric material 40. Central portion 34 preferably is covered with 3 layers of dielectric material 40. However, more or less layers can be used. The dielectric material 40 is provided as an insulating layer between electrical and electronic components and the conductive steel of the substrate 12. The dielectric material can be a commercially available screen printable thick film dielectric material from Heraeus Corporation of West Conshohocken, Pa.

Several electrically conductive traces 44, wire bond pads 45, capacitor mounting pads 46 and integrated circuit mounting pads 48 are located on top of dielectric material 40. Conductive traces 44, wire bond pads 45, capacitor mounting pads 46 and integrated circuit mounting pads serve as electrical conductors between the various circuit components. Conductive traces 44, wire bond pads 45, capacitor mounting pads 46 and integrated circuit mounting pads 48 can be formed from a screen printed thick film conductor material that is commercially available from Heraeus Corporation of West Conshohocken, Pa.

Several strain sensitive resistors 50,52,54 and 56 are located on top of the dielectric material 40 and are electrically connected to conductive traces 44. The strain sensitive resistors are sensitive to strain applied to substrate 12 and change resistance in proportion to the amount of applied strain. The strain sensitive resistors 50,52,54 and 56 can be formed from a screen printed thick film resistor material that is commercially available from Heraeus Corporation of West Conshohocken, Pa.

The strain sensitive resistors 50, 52, 54 and 56 are interconnected to form a Wheatstone bridge circuit to allow for relative measurement of the strain applied to the sensor.

A protective coating 90 (partially shown in FIG. 5) may be applied over strain sensitive resistors 50–56 and conductive traces 44 to further insulate the strain sensor 10 from electrical shorts or from physical or chemical abrasion. For example, since the strain sensor 10 is intended to be placed in an automobile, a consumer may inadvertently spray cleaning agents on the strain sensor 10.

The protective coating 90 preferably would cover all of the raised area 34 except for wire bond pads 45, capacitor mounting pads 46 and integrated circuit mounting pads 48.

Figure 5:
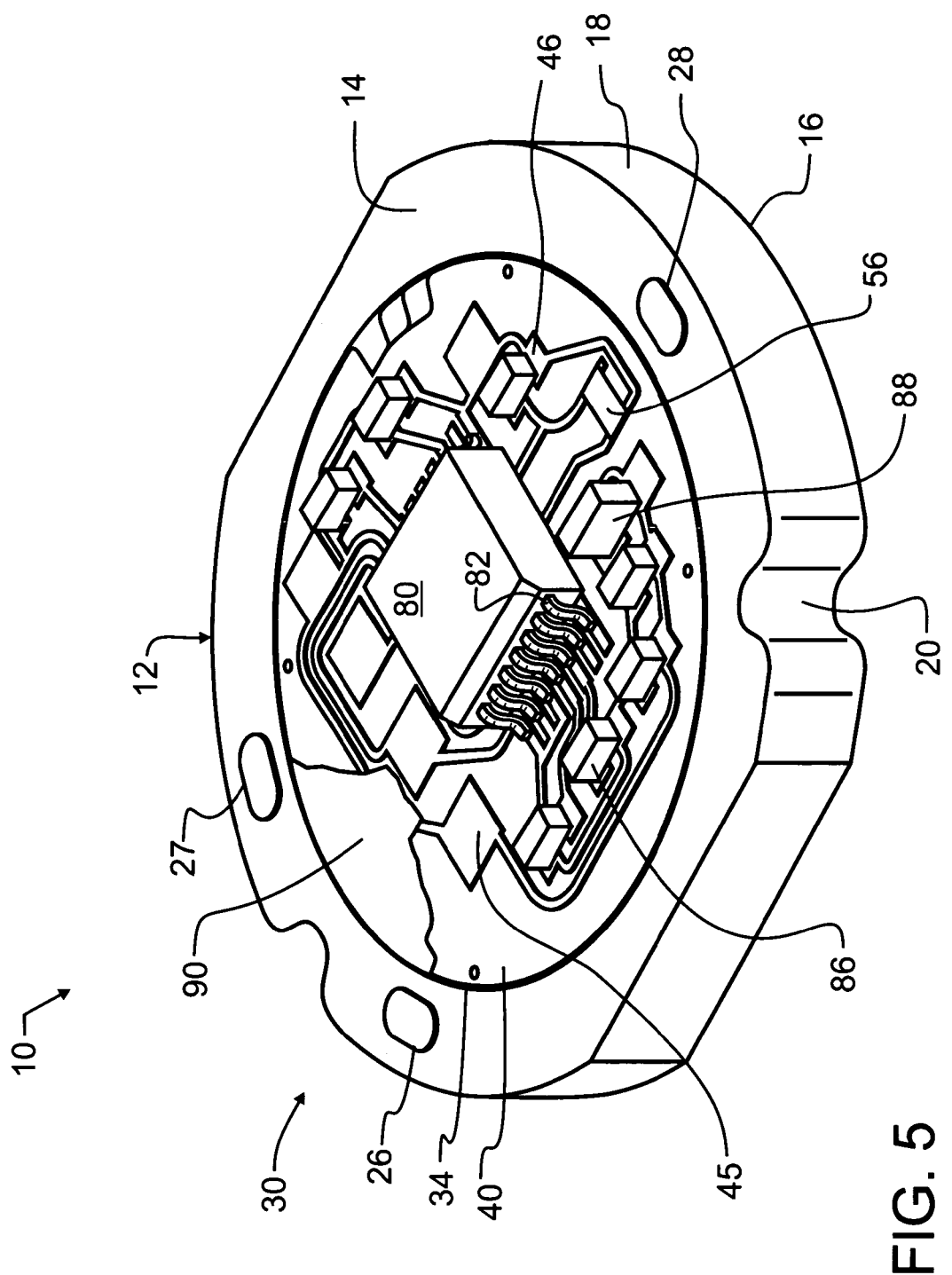
FIG. 5 is an assembled view of FIG. 1.

Turning to FIG. 5, an assembled view of substrate 12 is shown. Electronic components such as integrated circuit 80 and capacitors 86 and 88 are mounted to substrate 12. Integrated circuit 80 has leads 82 that are attached to integrated circuit mounting pads 48 using a reflowed solder paste (not shown). Capacitors 86 and 88 are attached to capacitor mounting pads 46 using a reflowed solder paste. Attaching active electronic components to substrate 12 allows the sensor to further act as a printed circuit board.

Integrated circuit 80 can be used because the output from the strain sensor 10 is a relatively low-level electrical signal and is therefore susceptible to electromagnetic interference from surrounding sources. By amplifying or conditioning the electrical output from the strain sensor 10, the signal can be used with greater reliability. If the signal from the strain sensor 10 is used by a device in close physical proximity to the sensor 10, this amplification may not be required and the passive and electrical components may not be needed.

Figure 7:
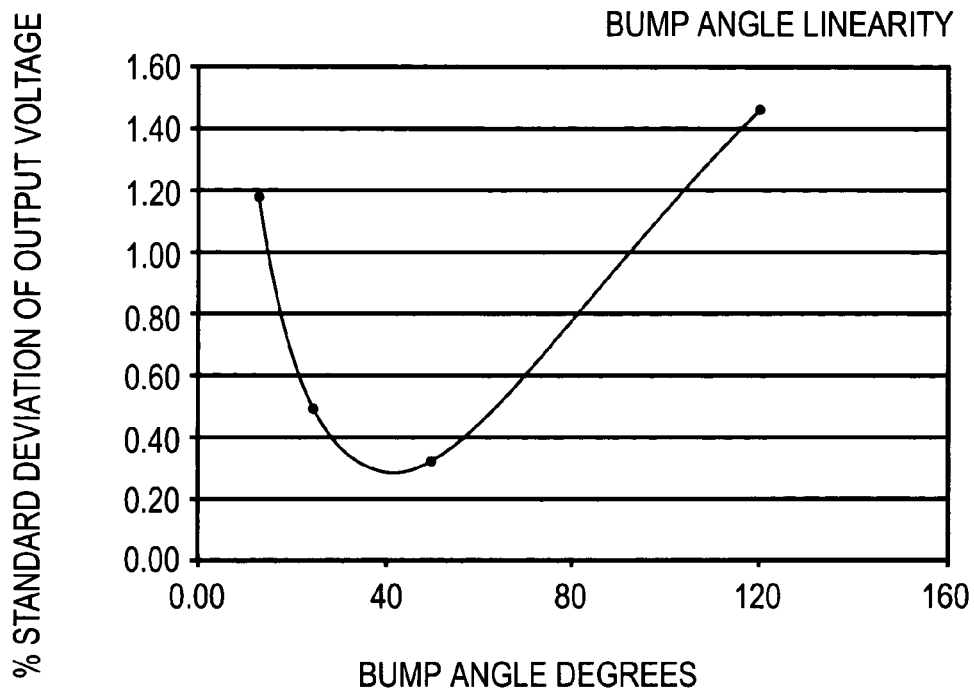
FIG. 7 is a graph showing how the linearity of the sensor output voltage is affected by bump angle.

Referring to FIG. 7, a graph of standard deviation of the output voltage versus bump angle for sensor 10 is shown. The graph shows how the separation angle between bumps 26 and 27 changes the linearity of the output voltage produced when a voltage is placed on resistors 50–56 and a load is applied to strain sensor 10. Several trials were run and the standard deviation of the measured output voltage was calculated for several bump angles. The graph shows that the lowest error signals or most linear signals were obtained with a bump angle around 50 degrees.

Figure 8:
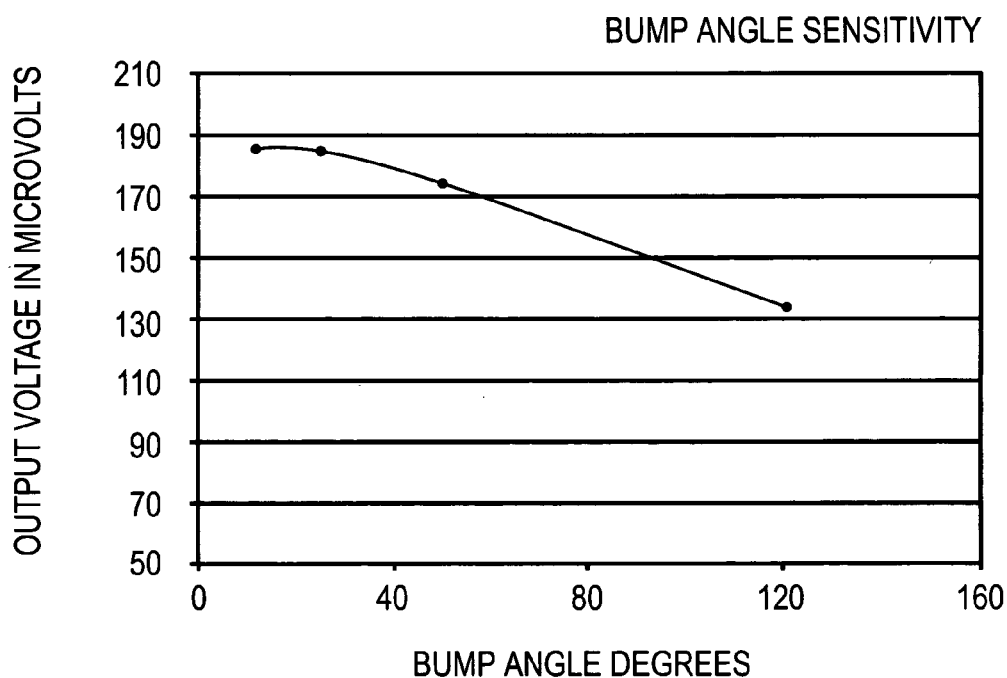
FIG. 8 is a graph showing how the sensitivity of the sensor output voltage is affected by bump angle.

FIG. 8 shows how the sensitivity of the sensor output voltage is affected by bump angle for sensor 10. FIG. 8 shows how the bump angle between bumps 26 and 27 changes the output voltage produced when a voltage is placed on resistors 50–56 and a load is applied to strain sensor 10. The graph shows that the largest output signals were obtained a bump angle less than 40 degrees.

Vehicle Seat Weight Sensor

Figure 6:
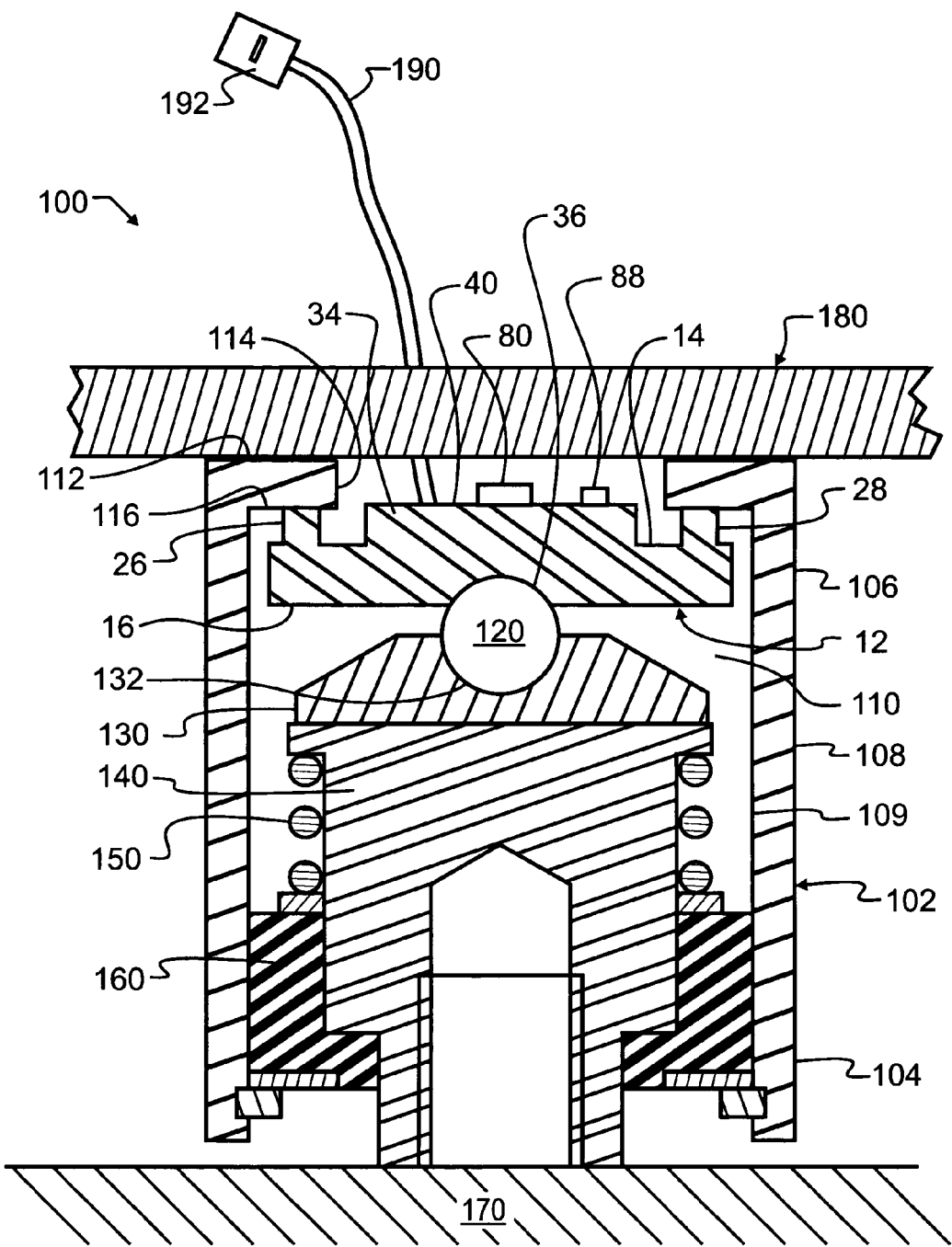
FIG. 6 is a side cross-sectional view of the strain sensor of FIG. 1 mounted in a vehicle seat housing.

Referring to FIG. 6, a side cross-sectional view of strain sensor 10 mounted in a vehicle seat is shown. Vehicle seat weight sensor 100 includes a cylindrical shaped housing 102. Housing 102 has ends 104, 106, an outer wall 108, inner wall 109 and cavity 110. Surface 112, wall 114 and wall 116 are located at end 106 of housing 102. A vehicle seat pan 180 rests on and is supported by surface 112. Only a portion of seat pan 180 is shown in FIG. 6. Housing 102 can be formed from a metal such as steel.

Several parts are assembled and mounted into cavity 110. A slideable table 130 has a recess 132. Table 130 rests on stem 140. Stem 140 is attachable to a vehicle floor 170. A bushing 160 is mounted in cavity 110 and surrounds stem 140. A spring 150 is mounted between stem 140 and bushing 160. Ball 120 is partially retained by recesses 36 and 122. Ball 120 is located between table 130 and substrate 12. Sensor 10 is supported between ball 120 and bumps 26, 27 and 28.

A wire harness 190 is shown extending away from substrate 12. Wire harness 190 would have one end connected to wire bond pads 45. The other end of wire harness 190 has an attached connector 192. Connector 192 would connect with the electronic circuit of an airbag control system (not shown).

Further details on the construction and operation of vehicle seat weight sensors can be found in U.S. patent publication number 2003/0213623. The contents of which are herein incorporated by reference in entirety for related and supportive teachings.

Strain sensor 10 can be placed anywhere in the load bearing path between a vehicle seat and floor. In this way, the weight of the seat occupant is passed from the seat pan 180, through the strain sensor 10 to the floor 170. The strain sensor 10 will, in this way, be able to provide an output indicative of the weight of the occupant.

The use of bumps 26, 27 and 28 causes substrate 12 to contact wall 116 in three defined locations. The bumps assure that substrate 12 contacts the housing in the same location and same orientation to the sense resistors. The bumps further assure that substrate 12 contacts the housing in a planar manner.

The use of bumps 26, 27 and 28 causes improved linearity and accuracy in the output signal of strain sensitive resistors 50–56 without the use of expensive machining operations.

Manufacturing and Assembly

Turning now to the manufacturing and assembly processes, strain sensor 10 is manufactured by first fine blanking substrate 12 from a plate of 430 stainless steel. The fine blanking operation also forms bumps 26, 27, 28 and central portion 34 at the same time. Next, substrate 12 is cleansed in a chemical bath to eliminate foreign material that could impede adherence of the porcelain layer.

The dielectric material 40 is screen printed onto central portion 34. After the dielectric material 40 is screened on, the substrate is fired at 850° C. for approximately 45 minutes in a tunnel kiln or furnace. The preferred profile of the firing step is a ramp up in temperature, followed by approximately 10 minutes at 850° C. and then a ramp down in temperature. The substrate 12 is then allowed to cool.

In order to ensure a complete covering of the steel by the porcelain material and to ensure proper insulative properties, two additional coatings of the dielectric material are added. These coatings are added in the same manner as the original coating. Together, the three coatings of porcelain material form a single dielectric layer 40 on raised central portion 34.

A conductor pattern of electrically conductive traces 44 is next screened onto the dielectric 40. This pattern includes all traces necessary to connect the strain sensitive resistors to be added later as well as any passive or active electrical components. The substrate is then fired again at 850° C. for approximately 45 minutes.

The thick film strain sensitive resistor material is then screened onto the dielectric layer 40 to form resistors 50, 52, 54 and 56. The strain sensitive resistors are interconnected by traces 44 to form a Wheatstone bridge circuit to allow for relative measurement of the strain applied to the sensor. The substrate is then fired at 850° C. for approximately 45 minutes.

The resistance of each of the strain sensitive resistors is then measured. In order to function properly, the bridge circuit should be balanced, with the various resistors being approximately equal in value. However, in the screening process it is common for the resistive material to vary in thickness and/or width along the prescribed area. This results in each of the resistors having a variance that is not acceptable to the bridge circuit. In order to balance the resistor values in the bridge, the resistors are trimmed. This process uses a laser to cut through portions of the resistive ink, causing the electrical current to flow through a restricted area. This effectively increases the resistance of the component being trimmed. By properly trimming the various resistors in this manner, the overall bridge circuit can be balanced.

Next, a solder paste is screened onto the capacitor mounting pads 46 and integrated circuit mounting pads 48. Passive and active electrical components such as integrated circuit 80 and capacitors 86 and 88 can be placed on the mounting pads by a conventional surface mount pick and place machine. Substrate 12 is then placed into a solder reflow oven to reflow the solder paste and attach the electrical components to substrate 12.

Many strain sensitive thick film resistor materials or inks may be used for the strain resistors 50–56. It is common to use strain sensitive materials on ceramic substrates that have a high degree of strain sensitivity. This is done to provide a higher level output signal. However, it has been found through experimentation that these materials are not compatible with the glass matrix of the dielectric material. Thus, the signals from these strain sensitive inks are erratic and unpredictable. These strain sensitive inks can not, for this reason, be used in applications using dielectric screened on steel as the dielectric material.

It has been found that by selecting a resistive ink material that is compatible with the dielectric material a functional strain sensitive material can be derived. Many suppliers provide ink materials that are compatible with a dielectric for use on steel. These materials can be modified to arrive at a strain sensitive ink that can be used on the dielectric material on steel. Strain sensitive inks that properly function on the dielectric material screened to steel can have a temperature coefficient of resistance (TCR) of approximately 50 PPM and a gage factor of range of 8–9.

While the invention has been taught with specific reference to these embodiments, someone skilled in the art will recognize that changes can be made in form and detail without departing from the spirit and the scope of the invention. For example, while the invention has been taught with reference to a vehicle seat weight sensor, it will be recognized that a strain sensor of this type can be used in a wide variety of applications. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A strain sensor comprising:
   a load carrying member having a top and bottom surface and an outer peripheral edge;
   at least three bumps formed on the top surface and located toward the outer peripheral edge;

a housing, the load carrying member mounted adjacent the housing such that the bumps are adapted to contact the housing;

at least one layer of dielectric material formed on the top surface;

at least one strain sensitive resistor formed on the dielectric material; and the bumps providing a planar contact between the housing and the load carrying member.

2. The strain sensor of claim 1, further comprising:

at least one conductive trace formed on the dielectric material, the conductive trace providing an electrical connection to the strain sensitive resistor.

3. The strain sensor of claim 2, further comprising:

a connection pad formed on the dielectric material, the conductive trace electrically connected to the connection pad.

4. The strain sensor of claim 1 wherein a portion of the bumps have an angular separation between 12 and 60 degrees.

5. A strain sensor comprising:

a substrate having a top surface and a bottom surface;

a plurality of bumps located on the top surface, the bumps extending above the top surface, the bumps further being arranged in a pattern, the bumps being adapted to form a planar contact between a housing and the substrate when a load is applied to the housing;

a dielectric material located on the top surface;

at least one strain sensitive resistor located on the dielectric material; and a plurality of conductive traces formed on the dielectric material and electrically connected with the strain sensitive resistor.

6. The strain sensor of claim 5, wherein the bumps are arranged about an outer peripheral edge of the substrate.

7. The strain sensor of claim 5 wherein at least a portion of the bumps have an angular separation between 12 and 60 degrees.

8. The strain sensor of claim 5 wherein the substrate has a central raised portion, the bumps being arranged around the central raised portion.

9. The strain sensor of claim 8, wherein the resistor is mounted on the central raised portion.

10. The strain sensor of claim 5, wherein the strain sensor is mounted in a vehicle seat.

11. A strain sensor comprising:

a substrate having a top and bottom surface;

a central raised portion defined on the top surface of the substrate;

at least two bumps formed on the top surface of the substrate, the bumps located outside of the central raised portion and toward an outer peripheral edge of the substrate;

at least one layer of dielectric material formed on the central raised portion;

at least one strain sensitive resistor formed on the dielectric material, the strain sensitive resistor being adapted to change resistance in response to an applied load; and the substrate configured to be mounted adjacent a housing such that the bumps are adapted to contact the housing and form a planar contact between the housing and the substrate.

12. The strain sensor of claim 11, wherein a recess is located on the bottom surface of the substrate.

13. The strain sensor of claim 12, wherein the recess is located below the central portion.

14. The strain sensor of claim 12, wherein the recess is adapted to mate with a ball.

* * * * *